Nov. 24, 1970
F. G. PRIBBERNOW
3,542,593
METHOD AND APPARATUS FOR CLEANING A BEDDED
RESIDUE FROM THE FLOOR OF A TANK
Filed April 12, 1966
3 Sheets-Sheet 2
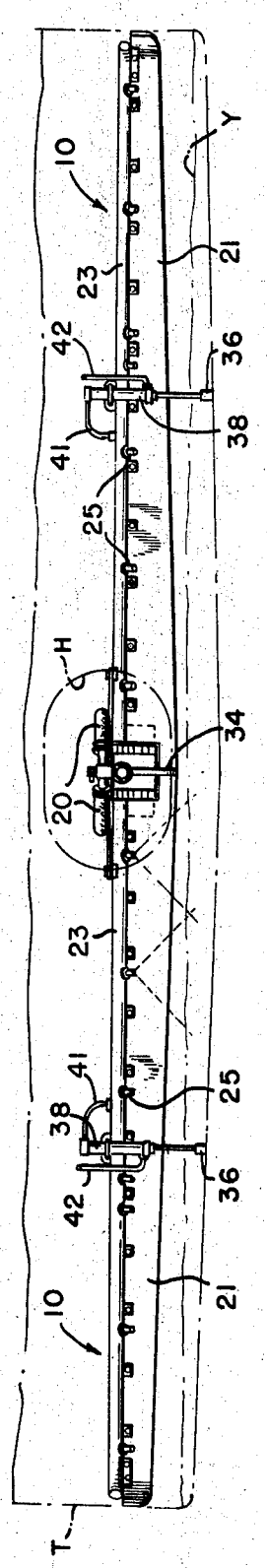
FIG—4
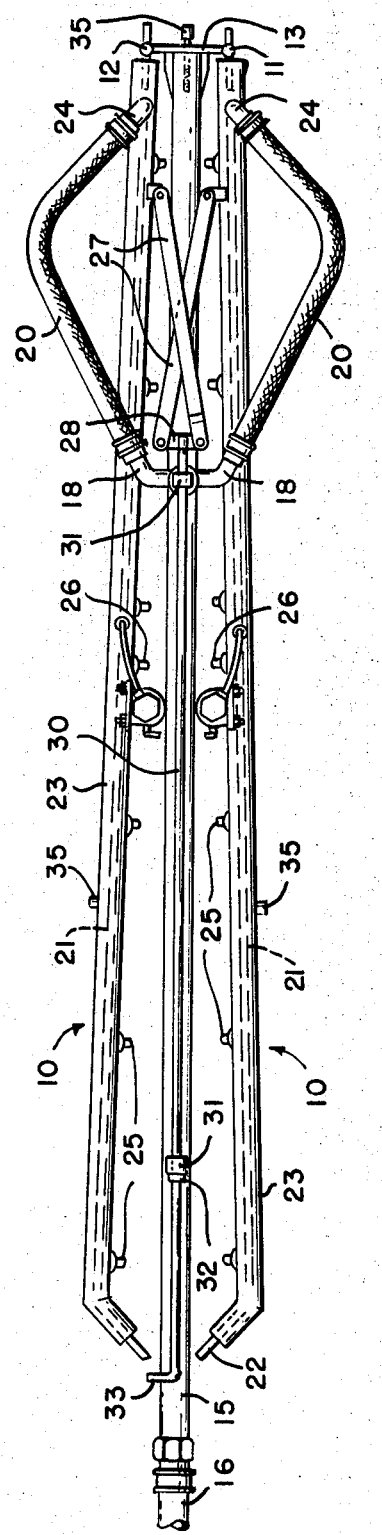
FIG—5
INVENTOR.
FREDERICK G. PRIBBERNOW
BY
ATTORNEYS Nov. 24, 1970 — F. G. PRIBBERNOW — 3,542,593
METHOD AND APPARATUS FOR CLEANING A BEDDED
RESIDUE FROM THE FLOOR OF A TANK
Filed April 12, 1966 — 3 Sheets-Sheet 3
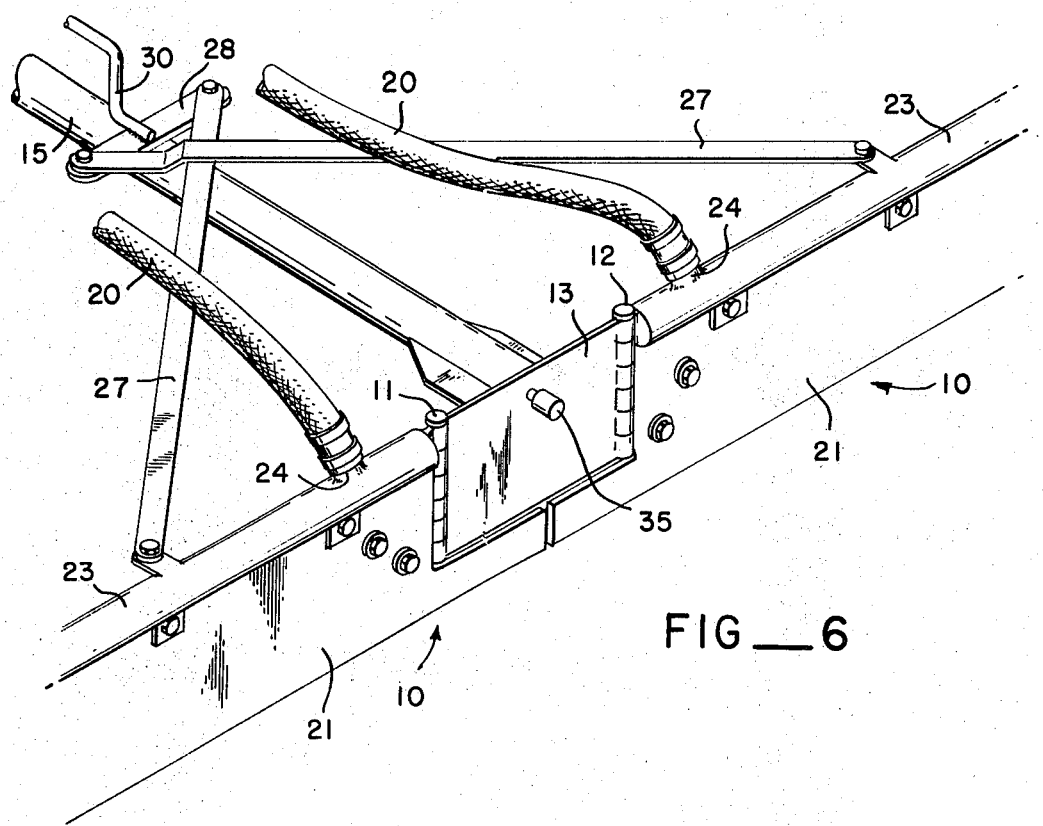
FIG __ 6
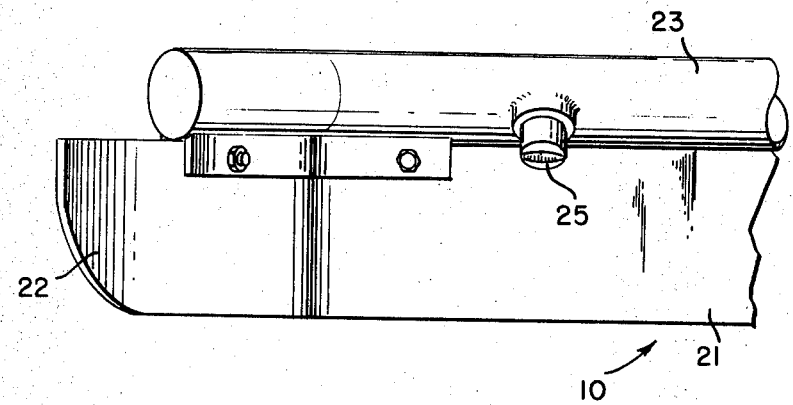
FIG __ 7
INVENTOR.
FREDERICK G. PRIBBERNOW
BY
Seed, Berry & Dowrey
ATTORNEYS United States Patent Office 3,542,593
Patented Nov. 24, 1970

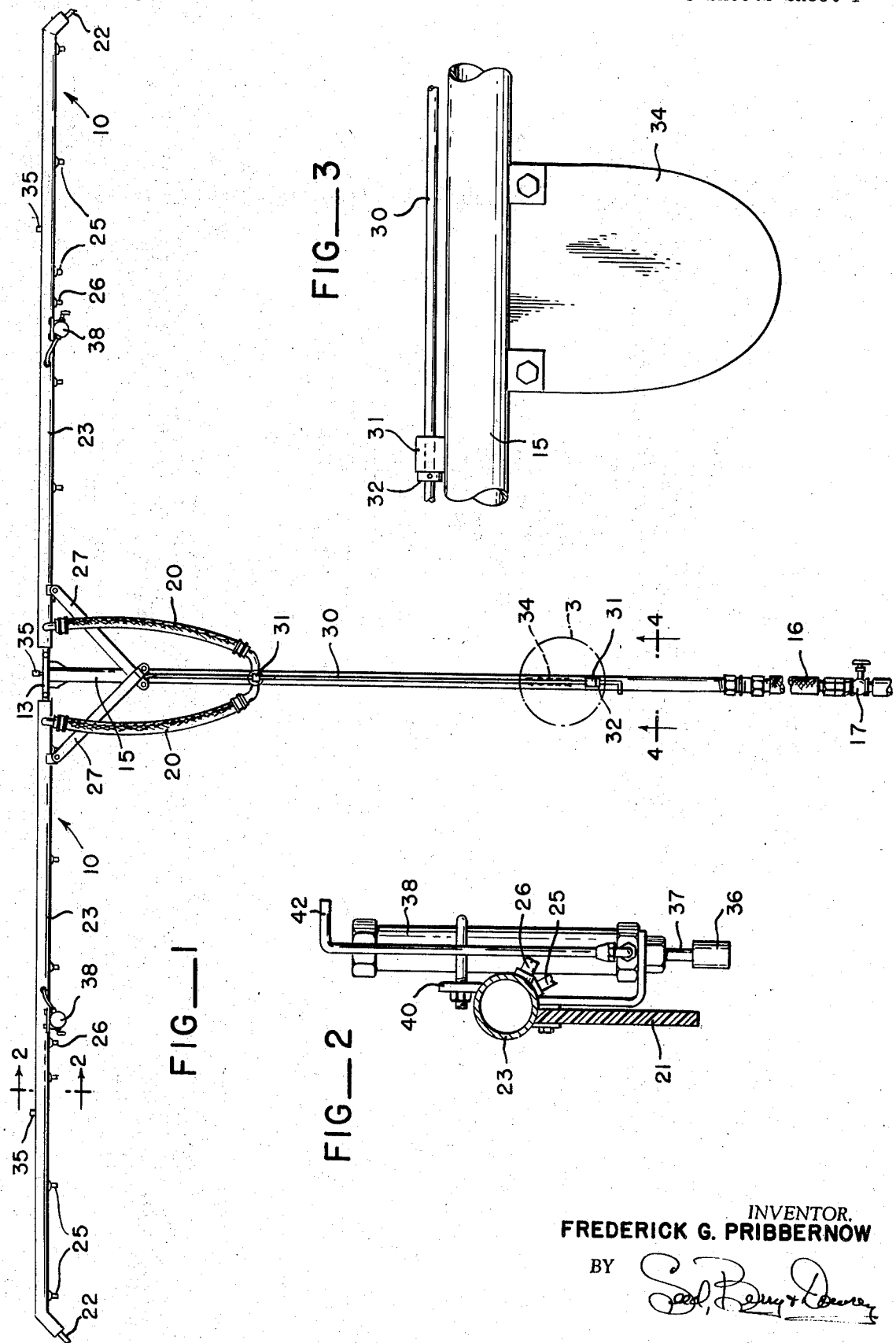

1

3,542,593
METHOD AND APPARATUS FOR CLEANING A BEDDED RESIDUE FROM THE FLOOR OF A TANK
Frederick G. Pribbernow, Bellevue, Wash., assignor to Sicks' Rainier Brewing Co., Seattle, Wash., a corporation of Washington
Filed Apr. 12, 1968, Ser. No. 720,970
Int. Cl. B08b 9/08, 3/02, 3/18
U.S. Cl. 134—24           10 Claims

ABSTRACT OF THE DISCLOSURE

A method and device for removing bedded yeast from emptied fermentation tanks of a brewery. Arms are provided from which pressure jets of water are sprayed and which can be raised and lowered by pressure of the water through regulation of the volume supplied, the arms being foldable into a small compass for passing the same through the tank's manhole. The arms are also provided with scraper vanes attached to the underside of same to facilitate movement of the yeast to the outlet drain of the fermentation tank.

---

This invention relates to the cleaning of tanks, and pertains especially to a means and method for cleaning the fermentation tanks used in the brewing industry so as to remove therefrom the layer of settled yeast which remains on the bottom of the tank after the beer or other brew which has been aged in the tank has been withdrawn. Brewer's yeast is somewhat viscous and clinging, and normally becomes quite compact as it settles out of the aging beer. In consequence thereof it has been difficult to clean the tank, requiring that the yeast bed be stirred and diluted in order that the same will flow from the tank's outlet opening into a discharge pipe. This outlet opening is located in the floor of the tank adjacent the front wall. Even when diluted it is usually necessary that the sludge be pushed or scraped toward the outlet nozzle.

Heretofore, the accepted method of cleaning the fermentation tanks is for a man to work within the tank, entering through the manhole which is provided in the front wall at a point central to the width and spaced a foot or so above the floor. Within the tank the worker uses a water hose and a large rubber scraper. The tanks are quite large, and the better part of a day has been required in order for the interior to be thoroughly cleaned. The manhole is no larger than is required for access and this perforce creates a fume problem within the tank. The worker faces danger from too high a concentration of carbon dioxide gas, which is present as a by-product of fermentation.

The present invention aims to provide a means and method by which to easily and expeditiously clean fermentation tanks from a point of control exterior thereto, obviating need for a man to enter the tank. This principal object and other more particular objects and advantages of the invention will appear and be understood in the course of the following description and claims, the invention consisting in the novel method and in the construction, adaptation and combination of parts, hereinafter described and claimed.

In the accompanying drawings:

FIG. 1 is a fragmentary top plan view illustrating a tank-cleaning device constructed to embody preferred teachings of the present invention.

FIG. 2 is a longitudinal vertical sectional view drawn to an enlraged scale on line 2—2 of FIG. 1.

FIG. 3 is a fragmentary enlarged-scale side elevational view detailing the portion of the device circled at 3—3 in FIG. 1.

FIG. 4 is a transverse vertical sectional view on the line 4—4 of FIG. 1, with the scale somewhat reduced and shown within a fermentation tank in the performance of its cleaning function, the tank and a residue bed of yeast on the floor thereof being shown in phantom.

FIG. 5 is a fragmentary top plan view showing the device in an inoperative folded condition, and employing a scale enlarged from that of FIG. 1.

FIG. 6 is an enlarged-scale fragmentary perspective view of the folding head structure of the device; and FIG. 7 is a fragmentary enlarged-scale rear elevational view of the outer end portion of one of the two folding wings provided in the head structure.

The device is here shown as being applied to a rectangular type of fermentation tank, represented in FIG. 4 of the drawings by the letter T. The referred-to manhole is denoted by H, and the bed of yeast by Y.

According to the present invention there is provided a folding head composed of two arms denoted generally by the numeral 10 and each hinged, as at 11 and 12, to a mounting plate 13 for movement through an approximate 90° swing between a folded position whereat the two arms lie approximately parallel to one another and an extended position placing the arms in a coplanar condition.

The mounting plate is welded or otherwise made rigid with the front end of a rigid tubular tree 15 occupying the longitudinal median line of the device and detachably connected by its rear end with a flexible hose line 16 leading from a high pressure (say 100 p.s.i.) source of water supply. A volume-controlling valve 17 is included in the hose line, spaced from the mounting plate 13 a distance greater than the length of the tank, thus to lie exteriorly of the tank when the cleaning device has been introduced to the tank and propelled therein to a position bearing against the tank's rear wall. At a point proximal to the front end of the tree, nipples 18 extend laterally from opposite sides and are each connected with a respective short length of flexible hose 20. Other than for the nipples the front end of the tree is closed.

Each of the two arms 10 provides a vane-like scraper 21. Such scraper vane has a bottom profile matching that of the tank floor over which it rides, and is composed of polyethylene or other suitable material which will slide easily without scratching the surface of the tank. When applied to a rectangular tank of, say, 12 foot width, each scraper vane is approximately six feet in length and has its outer end curled rearwardly in a moderate degree, as at 22. The scraper vanes are rigidly surmounted by a respective manifold pipe 23 having its two ends closed and presenting a nipple 24 connecting with a respective one of the two flexible hoses 20.

Each of said manifolds 23 is provided at spaced intervals of its length with a plurality of discharge nozzles 25. As can be best seen from an inspection of FIG. 2 such nozzles are pointed rearwardly approximately 45° from the perpendicular. The discharge pattern is fan-shaped, and for the several nozzles related to each manifold spray in a common plane. The spacing is such that complete coverage is obtained, and this is to say that the spray projected from each nozzle laps the spray projected from the next adjacent nozzle. In addition to the nozzles 25 each manifold desirably has one or more nozzles 26 pointing rearwardly in a degree greater than that of the nozzles 25, say 22½° off the horizontal. The spray from both the nozzles 25 and the nozzles 26 functions in part to stir and dilute the yeast and in part to spread the arms and propel the device forwardly within the tank, albeit the primary purpose of the more shallow sprays is that of propulsion. Links 27 extend diagonally rearwardly from each arm, crossing one another and connecting by their rear ends with a crossbar 28. A rod 30 is welded to the cross-bar, and extends rearwardly on the longitudinal median line of the tree through a pair of guides 31 welded to the tree. A stop-collar 32 fixed to the rod limits the spread movement of the arms, being brought to bear against the rear guide as the two arms reach a coplanar condition. The rear end of the guide-rod is hooked, as at 33, to form a handle. The handle is pulled rearwardly by the operator when it is desired to fold the arms. Such operation is performed after a cleaning operation has been completed, and puts the device in a condition enabilng the same to be withdrawn through the manhole. A skid 34 depends from the tree to give support to the rear end. As with the scraping vanes 21, bumpers 35, and feet 36 now to be described, the skid is composed of polyethylene. Said bumpers extend forwardly from the mounting plate and from each of the two arms.

There are two of said feet, each presented upon the lower end of a piston rod 37 working in a respective single-acting vertical cylinder 38. The cylinders are mounted in brackets 40 which are welded to the manifolds at point more or less median to the length. Water under pressure is fed from the manifolds through pipes 41 to the upper ends of the cylinders. Riser pipes 42 are provided for either venting air from or supplying air to the lower ends of the cylinders. In the inactive fully retracted position the feet lie flush with the lower edge of the related scraper vane. When fully extended they occupy the position shown in FIG. 4. Selected positions between these two extremes are afforded by governing, through regulation of the control valve 17, the water pressure to which the pistons, working in the cylinders 38, are subjected.

When all beer has been withdrawn from the fermenting tank only the yeast bed in the botton of the tank will remain. The tank manhole door must be kept open. The device, in the folded condition, is inserted through the manhole, hinged end first. The hose line 16 with its control valve 17 are attached. The tank outlet nozzle is connected to a pump or other desired yeast handling equipment, and the tank's outlet valve is opened.

With the hinged end of the device pointed toward the rear of the tank, and with the device approximately centered in the tank and still folded the valve 17 is opened gradually. Water flows through hose 16 into the tree and thence through hoses 20 into the manifolds to issue from the nozzles and exert pressure upon the pistons of the cylinders 38. As the pressure builds up the arms 10 move to their extended position and rise due to the pressure created within the cylinders.

At this point, the device extends across the full width of the tank. The bottom edges of the scraper vanes just skim the top surface of the yeast bed. The device now moves toward the rear of the tank due to the propulsion effect of the spray jets which are issuing from the nozzles.

As the device works toward the rear of the tank, the spray nozzles accomplish the necessary stirring and dilution of the yeast. The device moves easily, with feet 36 and skid 34 giving support, travelling approximately along the centerline of the tank as the vane ends 22 brush against the tank sidewalls and the trailing hose 16 produces a "sea-anchor" rudder effect.

At any time desired the device may be made to perform a scraper function, and pull liquefied yeast toward the tank outlet. This is accomplished by shutting off the water supply and pulling on hose 16 to draw the fluidized yeast toward the tank outlet. Nozzle action can be resumed by reopening valve 17. When the device reaches the rear of the tank, the bumpers 35 prevent damage to the tank wall lining.

When the yeast has been removed, the device is used to rinse the floor of the tank. One traversal of the tank floor accomplishes this rinsing action.

When the cleaning operation has been completed the device is retracted by pulling on hose 16 until the rear end of the tree reaches the manhole. The arms are then folded by pulling on the handle 33, which allows the device to be withdrawn through the manhole.

It will be apparent that the invention leads itself to use in a cylindrical tank as well as the rectangular tank which I have elected to illustrate. For a cylindrical tank the scraping skirt would be modified in point of its profile configuration so that it conforms more or less closely to the cross-sectional configuration of the tank, and the folding arms would have a span considerably less than the diameter of the tank.

It is believed that the invention will have been clearly understood from the foregoing detailed description of my now-preferred illustrated embodiment. Changes in the details of construction may be resorted to without departing from the spirit of the inventiton and it is accordingly my intention that no limitations be implied and that the hereto annexed claims be given the broadest interpretation to which the employed language fairly admits.

The embodiments of the invention in which an exclusive property or privilege is claimed are defined as follows:

1. The method of cleaning a bedded residue from the floor of a tank, which comprises introducing into the front portion of the tank a T-shaped mobile member the cross-arm of which lies to the front and serves as a manifold for a plurality of jet nozzles angled in a downward and rearward direction, and alternately performing the following operations: (1) supplying to the manifold a fluid thinning agent under relatively high pressure so that the issuing jets break up the bed and at the same time propel the mobile member forwardly toward the back of the tank, and (2) cutting off or reducing the supplied fluid while drawing the member rearwardly so that the cross-arm acts as a scraper to move the loosened bed toward the front of the tank.

2. The method claimed in claim 1 in which elevators are provided for the cross-arm said elevators being operated by the pressure of the supplied fluid, and changing at will the level at which the jets issue from the manifold by the expedient of increasing or decreasing the volume of fluid supplied to the manifold.

3. A device for spraying a fluid material over a floor surface comprising a mobile structure formed to a T-shape with the cross-arm of the T being tubular and lying to the front of the device; a plurality of downwardly pointing jet nozzles operatively connected to said tubular cross-arm with said tubular cross-arm serving as a fluid-supplying manifold for said nozzles, at least some of said nozzles also pointing to the rear of said tubular cross-arm; and a connection means operatively connected to said cross-arm to supply said manifold with a pressurized supply of the fluid to be sprayed, said device being forwardly propelled, when in operation, by the force exerted by the jets of fluid issuing from the rearwardly pointing nozzles.

4. A device as claimed in claim 3 for use in spraying supplied water as pressure jets of water to remove a bedded residue from the floor of a tank having adjacent to its front wall an outlet and provided in said front wall with a manhole raised above the level of the floor, the T being comprised of a central tree to which two oppositely extending arm sections which form the cross-arm of the T are hinged so as to be folded inwardly upon the tree into a compact compass accommodated to the size of the manhole, the propulsion force exerted by water issuing from the rearwardly pointing nozzles serving to spread the arm sections from a folded to an extended condition when the device has been inserted into the tank.

5. A device as claimed in claim 4 having a means located at the rear end of the tree and adapted to be pulled by an operator reaching through the manhole into the interior of the tank for folding the arm sections preliminary to withdrawing the device through the manhole.

6. A device as claimed in claim 4 in which the tree is tubular, connected by its rear end with a hose via a valved hose connection and by its front end through flexible hose sections with the tubular arm sections.

7. A device as claimed in claim 4 having scraper vanes depending from the underside of the arm sections, said vanes being composed of a material which will slide easily and protect against scratching the surface of the floor, the bottom profile of the vanes approximating the cross-sectional surface contour of the floor.

8. A device as claimed in claim 4 in which all surfaces liable to be brought into contact with the interior surface of the tank are composed of a material which will slide easily and give protection against scratching of said interior surface of said tank.

9. A device as claimed in claim 3 having piston-cylinder assemblies in which the cylinders are carried by the tubular cross-arm in a vertical position and connect by their upper ends with the manifold interiors, and wherein the pistons are urged downwardly by pressure passed from the manifold to the cylinder and provide downwardly extending piston rods which foot upon the floor surface to raise and lower the level at which the sprays issue from the nozzles.

10. A device as claimed in claim 9 in which said footing portions of the piston rods are composed of a material providing an easy gliding characteristic to the floor-contacting surfaces of said piston rods.

References Cited
UNITED STATES PATENTS

| | | | |
|---|---|---|---|
| 3,461,889 | 8/1969 | Saxonmeyer | 134—167 XR |
| 487,651 | 12/1892 | Truax | 15—104.16 |
| 1,178,518 | 4/1916 | Hinkey. | |
| 2,018,284 | 10/1935 | Schweitzer et al. | |
| 2,195,344 | 3/1940 | Slaugenhop. | |
| 2,217,360 | 10/1940 | Court. | |
| 2,245,554 | 6/1941 | Court | 134—24 |
| 2,306,926 | 12/1942 | Allen | 134—24 |
| 3,245,420 | 4/1966 | Cherney | 134—167 XR |
| 3,312,231 | 4/1967 | Monroe et al. | 134—24 XR |
| 3,358,935 | 12/1967 | Andersen | 134—167 XR |
| 3,383,729 | 5/1968 | Grove | 15—246.5 |

MORRIS O. WOLK, Primary Examiner

B. S. RICHMAN, Assitsant Examiner

U.S. Cl. X.R.

15—104.16, 246.5; 134—8, 167; 239—192, 532